United States Patent
Kotzin

(10) Patent No.: US 6,836,663 B1
(45) Date of Patent: Dec. 28, 2004

(54) WIRELESS COMMUNICATIONS DEVICE WITH NETWORK CACHE FUNCTION

(75) Inventor: Michael D. Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 505 days.

(21) Appl. No.: 09/667,999

(22) Filed: Sep. 22, 2000

(51) Int. Cl.[7] .............................................. H04Q 7/20
(52) U.S. Cl. ................ 455/445; 455/412.1; 455/414.1; 455/422.1
(58) Field of Search ................................ 455/422, 423, 455/424, 426, 445, 450, 451, 452, 412.1, 414.1, 41.2, 456.1, 422.1, 403; 715/530

(56) References Cited

U.S. PATENT DOCUMENTS

| | | | |
|---|---|---|---|
| 5,732,074 A | | 3/1998 | Spaur et al. |
| 5,878,218 A | * | 3/1999 | Maddalozzo et al. ........ 709/213 |
| 5,919,247 A | | 7/1999 | Van Hoff et al. |
| 5,983,098 A | * | 11/1999 | Gerszberg et al. ........ 455/426.1 |
| 6,032,227 A | * | 2/2000 | Shaheen et al. ............ 711/129 |
| 6,131,136 A | | 10/2000 | Liebenow et al. |
| 6,297,737 B1 | * | 10/2001 | Irvin ........................... 340/571 |
| 6,347,398 B1 | * | 2/2002 | Parthasarathy et al. ..... 717/178 |
| 6,377,608 B1 | * | 4/2002 | Zyren .......................... 375/132 |
| 6,405,027 B1 | * | 6/2002 | Bell ............................ 455/403 |
| 6,473,609 B1 | * | 10/2002 | Schwartz et al. ........... 455/406 |
| 6,487,180 B1 | * | 11/2002 | Borgstahl et al. ........... 370/310 |
| 6,493,550 B1 | * | 12/2002 | Raith ...................... 455/422.1 |
| 6,571,103 B1 | * | 5/2003 | Novakov .................... 455/464 |
| 2001/0051525 A1 | * | 12/2001 | Rayne ........................ 455/453 |
| 2002/0052898 A1 | * | 5/2002 | Schilit et al. ............... 707/530 |

FOREIGN PATENT DOCUMENTS

JP  403252736 A  11/1991

* cited by examiner

Primary Examiner—Sonny Trinh
(74) Attorney, Agent, or Firm—Paul J. Bartusiak; Lawrence J. Chapa

(57) ABSTRACT

A wireless communications device (100), after determining it can not locally satisfy a request for network data (201), sends a search query or request for data to a proximal device that has a network cache function (202). The proximal device searches for the requested data (203) and if the data is found, then the data is sent to the requesting wireless communications device from the proximal device (206). The data request is sent over a wide area network (204), for example, the Internet, if the proximal device does not have the requested data stored in a memory on the proximal device (204). The wireless communications device stores the data for subsequent use and, if necessary, subsequent provision to a proximal device.

26 Claims, 2 Drawing Sheets

WIRELESS COMMUNICATIONS DEVICE WITH NETWORK CACHE FUNCTION

FIELD OF THE INVENTION

The present invention relates generally to wireless communications devices, and in particular, to a wireless communications device that requests network data from proximal devices prior to making the request over a wide area network.

BACKGROUND OF THE INVENTION

A wireless communications device has an interface to communicate with other devices over the air. Exemplary wireless communications devices include cellular phones, personal digital assistants, pagers and computers. These communications devices allow subscribers to communicate with others even if they are away from their home or office. Moreover, the communications devices include hardware and software components to provide subscribers with data from the Internet. By virtue of an Internet connection, subscribers may download information such as news, stock trends, or weather and traffic reports.

Presently, the growth in the use of wireless communications devices has tremendously increased wireless traffic. The projected use of wireless devices to access information from the Internet will increase wireless traffic even more. The present and projected use of wireless traffic threatens to overload existing wireless, wide area systems and increase response time to users.

Internet caching is a known method for reducing traffic and increasing response time over an Internet network. One Internet caching scheme used in wired networks seeks to reduce response time by storing the most frequently requested data on network computers geographically dispersed in areas nearest to the people who request the information. In another Internet caching scheme, a request for data goes to the main server, but the data is delivered from the server in the network that has the fastest, shortest connection to the requester. Internet caching improves performance for the user and reduces traffic over wired networks. However, known Internet caching methods do not reduce traffic for a wireless interface used to access a wide area network.

Therefore, a need exists for a method and apparatus that reduces wireless traffic for access to a network.

DETAILED DESCRIPTION OF THE PREFERRED EMBODIMENTS

A wireless communications device requests network data from a proximal communications device prior to requesting the data from a wide area network in accordance with the present invention. First, the wireless communications device sends a request to a proximal device to obtain network data if the network data is not available in a local memory on the wireless communications device. The request is typically initiated when a subscriber enters a search query or requests data from the wide area network. Then, the proximal device determines whether the requested data is stored in its memory. Preferably, the proximal device has an Internet cache function that allows the proximal device to store query results that are received from the wide area network into a memory of the proximal device. If the proximal device has the requested information, then a copy of the data is sent to the wireless communications device. If the proximal device does not have the requested information, then the query is sent to the wide area network. The wireless communications device displays and stores the information that is received from the query. The stored information from the query is preferably made available for subsequent queries by the wireless communications device and devices proximal to the wireless communications device. This invention advantageously allows for a reduction in channel loading on wide area communications systems.

Figure 1:
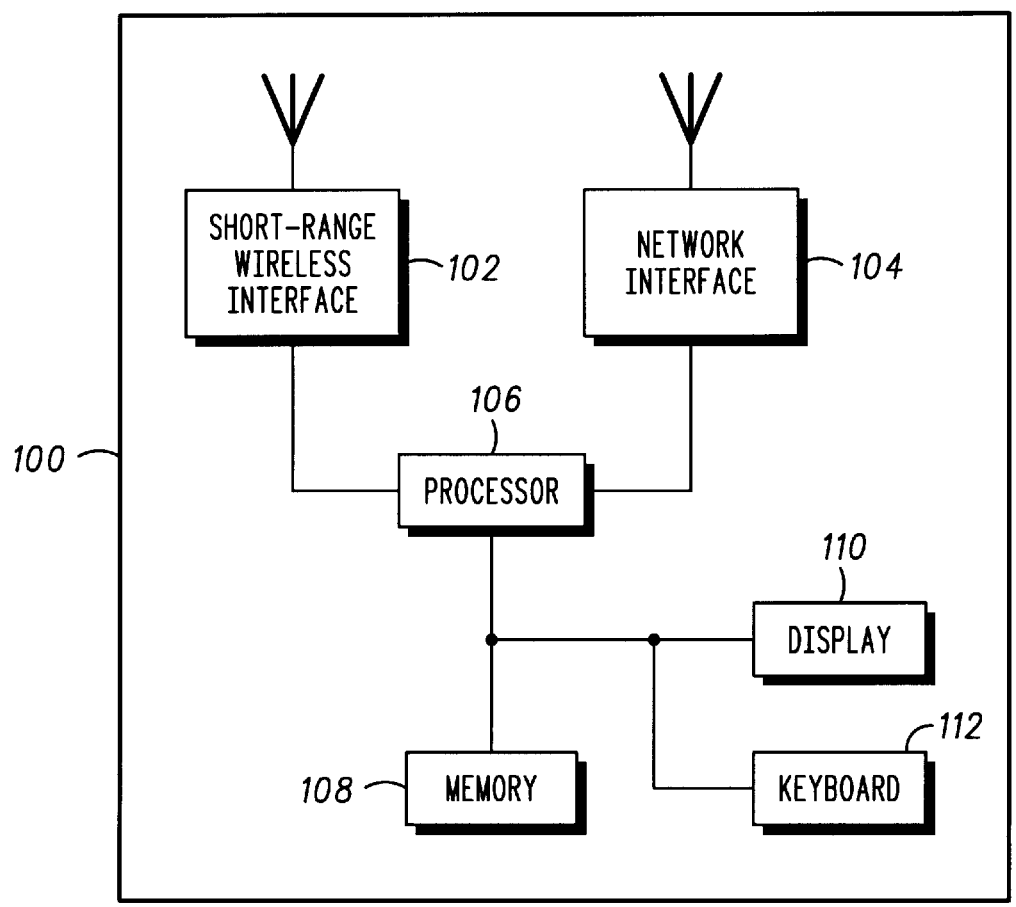
FIG. 1 is a block diagram of a preferred embodiment of a wireless communications device in accordance with the present invention.

FIG. 1 is a block diagram of a preferred embodiment of a wireless communications device 100 in accordance with the present invention. Device 100 includes a processor 106 (also referred to as a controller), a memory 108, a display 110, a keyboard 112, a short-range wireless interface 102, and a network interface 104. Wireless communications device 100 is alternatively a wireless telephone, pager, personal digital assistant, or computer. Processor 106 and memory 108 provide control over the functions of device 100. Display 110 and keyboard 112 provide a user interface for device 100. In particular, display 110 is an output device for visually and audibly displaying data to a subscriber. Keyboard 112 is an input device for receiving requests and commands from a subscriber. Short-range wireless interface 102 provides an interface to communicate with proximally located devices. As the name suggests, short-range wireless interface 102 is preferably used to communicate with devices within a short distance form device 100. Network interface 104 preferably communicates with a wide area network, for example, the Internet.

As shown in FIG. 1 processor 106 is coupled to memory 108. Preferably, memory 108 stores programs that are executed by processor 106 to implement the functions of devices 100, including the caching functions in accordance with the invention. Memory 108 also stores data. Short-range wireless interface 102 and network interface 104 are also coupled to processor 106. Processor 106 controls communications over short-range wireless interface 102 and network interface 104.

Processor 106 is preferably a digital signal processor or a microprocessor. Memory 108 is preferably any suitable volatile or non-volatile memory, or a combination thereof, and memory 108 alternatively includes disk storage. Display 110 is any suitable display device that visually and preferably audibly displays data. For example, display 110 includes a liquid crystal display and a speaker.

Short-range wireless interface 102 is preferably a wireless communications interface for communicating with other wireless devices that are spatially close. In the illustrated embodiment, spatially close means within about 30 feet. In alternate embodiments the short-range wireless interface 102 is designed to communicate over ranges that are either shorter or longer than 30 feet. Short-range wireless interface 102 preferably includes a transmitter and receiver for transmitting and receiving data, respectively. The short range wireless communication link can be any of a frequency-hopped spread spectrum communication link, a code division multiple access (CDMA) spread spectrum communication link, an amplitude modulated communication link, a frequency modulated communication link, and a time division multiple access (TDMA) communication link. Most preferably, short-range wireless interface 102 complies with the BLUETOOTH short-range wireless standard outlined in "Specification of the BLUETOOTH System," volume 1, Core (e.g. v1.0B, Dec. 1, 1999), and volume 2, Profiles (v1.0B, Dec. 1, 1999), incorporated herein by reference. Alternatively, short-range wireless interface 102 is any wireless interface that operates over a short or long range, for example, a wireless LAN (e.g., 802.11 or HIPERLAN), a private wide area network, a cellular network, a paging network, or a satellite network.

Network interface 104 is preferably a wireless communications interface to a wide area network, such as the Internet. The wide-area network preferably comprises a cellular telephone or paging network. Alternatively, network interface 104 is a wired network interface, for example, a telephone line connection to the Internet. Thus, the short range wireless communication link has an air interface protocol that is different than that of the wide area network.

Figure 2:
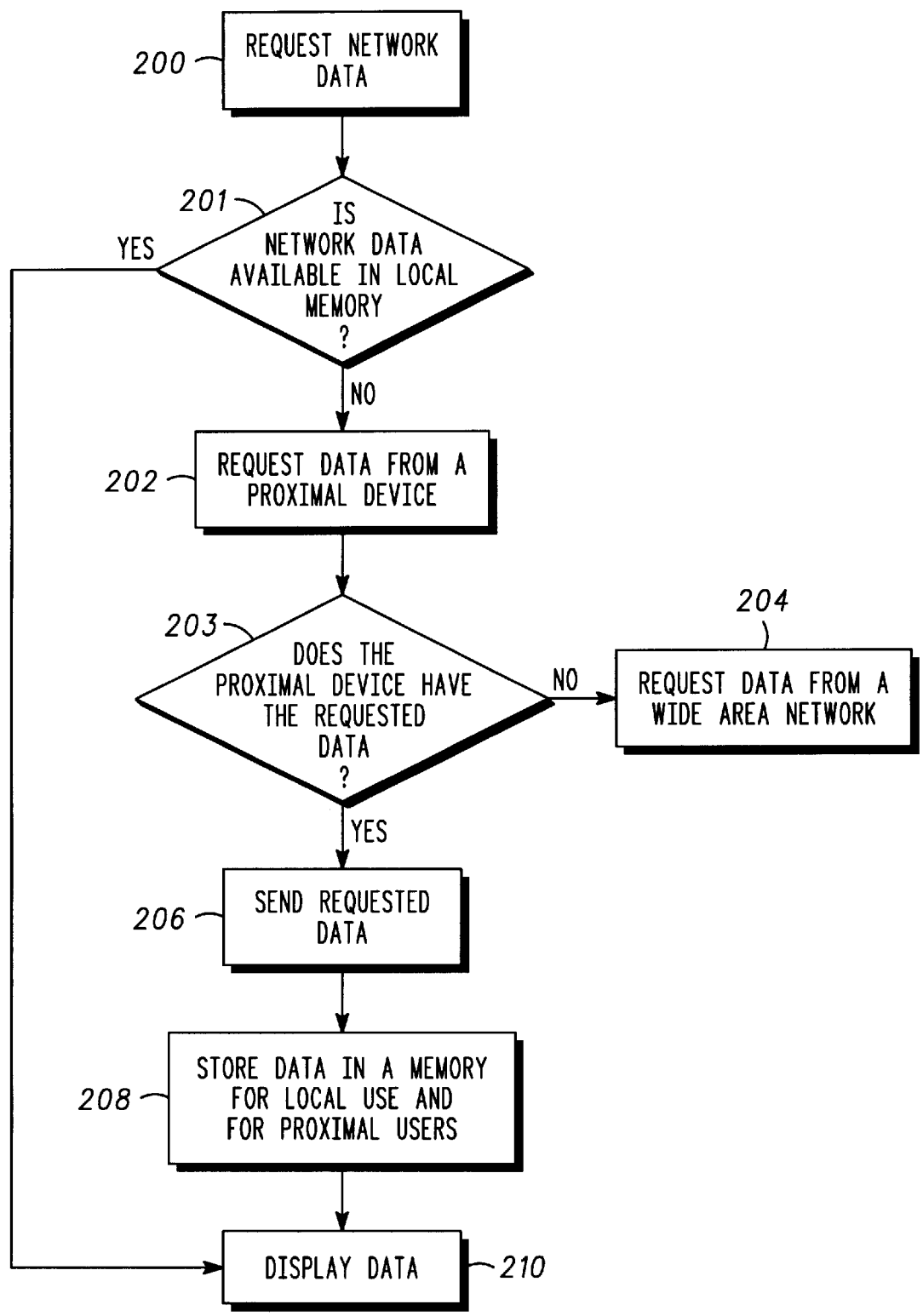
FIG. 2 is a flowchart illustrating a method to obtain network data from a proximal device in accordance with the present invention.

FIG. 2 illustrates a method to obtain network data in accordance with the present invention. FIG. 2 is described below with respect to the preferred embodiment shown in FIG. 1.

First, a wireless communications device requests network data (200). This is accomplished in the preferred embodiment by a subscriber requesting data using the user interface on device 100. Preferably the user interface interacts with a Web browser running on processor 106 and memory 108. After the user generates a request, a determination is preferably made as to whether the requested network data is available locally on the wireless communications device (201). If the requested network data is available locally, for example, in a memory on device 100, then the data is displayed. If, on the other hand, the requested data is not available locally, then device 100 requests the data from a proximal device (202). Preferably, short-range wireless interface 102 sends the request to a proximal device. The existence of the proximal device may be known, for example, via wireless polling procedures. Alternatively, the existence may be assumed.

The proximal device determines whether the requested data is stored in a memory on the proximal device (203). Preferably a layered network protocol is used to implement communications between the devices as is known to those skilled in the art. If the proximal device has the requested data, then the device sends a copy of the data to the wireless communications device (206), satisfying the request for data. If the proximal device does not have the requested data, then the request is sent over the wide-area network (204). This is accomplished in the preferred embodiment by processor 106 recognizing that the information is not available through short-range wireless interface and sending the request via network interface 104 to the wide area network. For example, a proximal device may return an indication that the requested data is not available, or after a predetermined amount of time without a response to its query, the wireless communication device 100 realizes that a proximal device is not available. Then processor 106 directs network interface 104 to request from a wide area network the data that was unavailable from the proximal device.

Device 100 stores the data obtained from short-range wireless interface 102 or network interface 104 in memory 108 on the device 100 (208). The data is stored for subsequent provision in response to a request from a proximal user and for use by the device 100. Device 100 displays the data received in the normal manner, which preferably includes visual and audible display (210).

By virtue of the present invention, a wireless communications device requests network data from a proximal device, if the network data is not stored on the wireless communications device. A proximal device satisfies the requests for information if it is available. If the information is not available from the proximal device, then a request for the network data is sent over the wide area network. Advantageously, the present invention significantly reduces channel loading on the wide area network.

Whereas the present invention has been described with respect to specific embodiments thereof, it will be understood that various changes and modifications will be suggested to one skilled in the art and it is intended that the invention encompass such changes and modifications as fall within the scope of the appended claims.

I claim:

1. A communications device comprising:
   a first wireless interface for communicating with at least one other device from a first set of one or more other devices via a first wireless connection;
   a network interface for communicating with at least one other device from a second set of one or more other devices via a network connection;
   a processor that:
   requests network data from the at least one other device from the first set of one or more other devices using the first wireless interface; and
   requests the network data from the at least one other device from the second set of one or more devices using the network interface if the network data is not available from the at least one other device from the first set of one or more other devices using the first wireless interface;
   wherein the first wireless interface is distinct from the network interface.

2. The communications device of claim 1 wherein the first wireless interface is adapted to communicate with other communications devices in close proximity.

3. The communications device of claim 1 wherein the network interface is a wireless interface.

4. The communications device of claim 1 wherein the network interface is a wired interface.

5. The communications device of claim 1 wherein the network interface is coupled to the Internet.

6. The communications device of claim 1 further comprising:
   a display unit coupled to the processor;
   a user input device coupled to the processor; and
   a memory coupled to the processor to store the network data that is retrieved from the first wireless interface or the network interface.

7. The communications device of claim 6 wherein the user input device is a keyboard.

8. The communications device of claim 6 wherein the processor determines whether the memory contains the network data prior to requesting the network data from the first wireless interface.

9. The communications device of claim 6 wherein the network data is supplied to another communications device over the first wireless interface.

10. The communications device of claim 1 wherein the communications device is at least one of a wireless telephone, pager, personal digital assistant, and computer.

11. The communications device of claim 1 wherein the first wireless interface and the network interface being distinct includes a wireless interface, which uses an interface protocol that is different than the interface protocol used by the network interface.

12. The communications device of claim 1 wherein the first wireless interface is an interface for an ad hoc network.

13. A method for obtaining data from proximal communications devices, the method comprising:
   a first wireless communications device requesting network data from a second wireless communications device via a first wireless interface;
   the second wireless communications device determining whether a memory on the second wireless communications device contains the network data that was requested by the first wireless communications device;
   if the network data is not in the memory, then the first wireless communications device requesting the network data from a wide area network via a network interface, which is distinct from the first wireless interface; and
   if the network data is in the memory, then the second wireless communications device sending a copy of the network data to the first wireless communications device.

14. The method of claim 13 further comprising the step of:
   the first wireless communications device storing the network data in a memory on the first wireless communications device.

15. The method of claim 14 further comprising the step of:
   the first communications device supplying the network data to another communications device.

16. The method of claim 13 further comprising the step of:
   the first wireless communications device displaying the network data on a display device.

17. The method of claim 13 wherein the first wireless communications device is adapted to communicate with other communications devices in close proximity.

18. The method of claim 13 wherein the wide area network is accessed via a wireless interface.

19. The method of claim 13 wherein the wide area network is accessed via a wired interface.

20. The method of claim 13 wherein the wide area network comprises an Internet.

21. The method of claim 13 wherein step of the first wireless communications device requesting the network data from the second wireless communications device further comprises:
   the first communications device determining whether the network data is available in a local memory on the first communications device; and
   the first communications device requesting data from the second communications device if the network data is not available in the local memory.

22. A method for a wireless communication device to obtain information, the method comprising:
   attempting to obtain the information from a nearby portable, wireless communication device via a short range wireless communication link;
   failing to obtain the information via the short range wireless communication link; and
   trying, in response to failing, to obtain the information from a remote location via any of a cellular communication link and a paging communication link, wherein the short range wireless communication link includes an air interface protocol different than an air interface protocol associated with the step of attempting.

23. The method as in claim 22 wherein the step of failing comprises any of:
   receiving an indication that the information is not available; and
   a passage of a predetermined amount of time without receiving the information.

24. A cellular telephone comprising:
   at least one transmitter operable to communicate via a cellular telephone network and via a different, short range, wireless communication link;
   at least one receiver coupled to the at least one transmitter and operable to communicate via the cellular telephone network and via the short range wireless communication link; a memory; and
   a controller coupled to the at least one transmitter, the at least one receiver, and the memory, wherein the controller, in response to a query for information, is operable to:
   search the memory for the information;
   attempt, responsive to the information not being in the memory, to communicate with a nearby wireless communication device via the short range, wireless communication link to obtain the information from the nearby wireless communication device; and
   try, responsive to not being able to obtain the information from the nearby wireless communication device, to obtain the information from a remote location via the cellular telephone network.

25. The cellular telephone as in claim 24, wherein the short range wireless communication link comprises any of a frequency-hopped spread spectrum communication link, a code division multiple access (CDMA) spread spectrum communication link, an amplitude modulated communication link, a frequency modulated communication link, and a time division multiple access (TDMA) communication link.

26. A cellular telephone comprising:
   at least one transmitter operable to communicate via a cellular telephone network and via a different, short range, wireless communication link;
   at least one receiver coupled to the at least one transmitter and operable to communicate via the cellular telephone network and via the short range wireless communication link;
   a memory; and
   a controller coupled to the at least one transmitter, the at least one receiver, and the memory, wherein the controller, in response to a query for data, is operable to:
   attempt to communicate with a nearby wireless communication device via the short range, wireless communication link to obtain the data from the nearby wireless communication device; and
   try, responsive to not being able to obtain the information from the nearby wireless communication device, to obtain the information from a remote location via the cellular telephone network.

* * * * *